United States Patent
Darolia et al.

(10) Patent No.: US 7,288,328 B2
(45) Date of Patent: Oct. 30, 2007

(54) SUPERALLOY ARTICLE HAVING A GAMMA-PRIME NICKEL ALUMINIDE COATING

(75) Inventors: Ramgopal Darolia, West Chester, OH (US); William Scott Walston, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/904,222

(22) Filed: Oct. 29, 2004

(65) Prior Publication Data

US 2006/0093851 A1   May 4, 2006

(51) Int. Cl.
- *B32B 15/01* (2006.01)
- *B63H 7/02* (2006.01)
- *F03B 3/12* (2006.01)

(52) U.S. Cl. ............... 428/680; 428/469; 428/472; 428/633; 428/632; 428/678; 428/679; 428/670; 416/241 R (58) Field of Classification Search ........... 428/680, 428/632; 416/241 R
See application file for complete search history.

(56) References Cited

U.S. PATENT DOCUMENTS

| 4,758,480 A | * | 7/1988 | Hecht et al. ............ 428/680 |
| 6,585,878 B2 | * | 7/2003 | Strangman et al. ...... 205/264 |
| 6,641,929 B2 | * | 11/2003 | Kelly et al. ............. 428/632 |

* cited by examiner

*Primary Examiner*—Jennifer McNeil
*Assistant Examiner*—Gordon R. Baldwin
(74) *Attorney, Agent, or Firm*—David L. Narciso; Gary M. Hartman; Domenica N. S. Hartman (57) ABSTRACT

An article for use in hostile thermal environments, such as a component of a gas turbine engine. The article includes a nickel-base superalloy substrate that is prone to formation of a deleterious secondary reaction zone (SRZ), and an overlay coating having a predominantly gamma prime-phase nickel aluminide ($Ni_3Al$) composition suitable for use as an environmental coating, including a bond coat for a thermal barrier coating. The coating comprises a chromium-containing nickel aluminide intermetallic overlay coating of predominantly the gamma prime phase, in which aluminum is present in the coating in an amount approximately equal to the aluminum content of the superalloy substrate so as to inhibit diffusion of aluminum from the overlay coating into the superalloy substrate.

23 Claims, 4 Drawing Sheets

I    External NiO, Internal $Cr_2O_3/Al_2O_3/Ni(Al,Cr)_2O_4$
II    External $Cr_2O_3$, Internal $Al_2O_3$
III    External $Al_2O_3$

SUPERALLOY ARTICLE HAVING A GAMMA-PRIME NICKEL ALUMINIDE COATING

STATEMENT REGARDING FEDERALLY SPONSORED RESEARCH

This invention was made with government support under Contract No. N00421-04-C-0035 awarded by U.S. Department of the Navy. The Government has certain rights in the invention.

BACKGROUND OF THE INVENTION

This invention relates to coatings of the type used to protect components exposed to high temperature environments, such as the hostile thermal environment of a gas turbine engine. More particularly, this invention is directed to the combination of a nickel-base superalloy substrate prone to the formation of deleterious reactions with aluminum-containing coatings, and a predominantly gamma-prime ($\gamma'$) phase nickel aluminide overlay coating that reduces the incidence of such reactions when used as an environmental coating or as a bond coat on the superalloy substrate.

Certain components of the turbine, combustor and augmentor sections that are susceptible to damage by oxidation and hot corrosion attack are typically protected by an environmental coating and optionally a thermal barrier coating (TBC), in which case the environmental coating is termed a bond coat that in combination with the TBC forms what may be termed a TBC system. Environmental coatings and TBC bond coats are often formed of an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coat promotes a chemical bond with the TBC. However, a thermal expansion mismatch exists between metallic bond coats, their alumina scale and the overlying ceramic TBC, and peeling stresses generated by this mismatch gradually increase over time to the point where TBC spallation can occur as a result of cracks that form at the interface between the bond coat and alumina scale or the interface between the alumina scale and TBC. More particularly, coating system performance and life have been determined to be dependent on factors that include stresses arising from the growth of the TGO on the bond coat, stresses due to the thermal expansion mismatch between the ceramic TBC and the metallic bond coat, the fracture resistance of the TGO interface (affected by segregation of impurities, roughness, oxide type and others), and time-dependent and time-independent plastic deformation of the bond coat that leads to rumpling of the bond coat/TGO interface. Therefore, advancements in TBC coating system are concerned with delaying the first instance of oxide spallation affected by the above factors.

Environmental coatings and TBC bond coats in wide use include alloys such as MCrAlX overlay coatings (where M is iron, cobalt and/or nickel, and X is yttrium or another rare earth element), and diffusion coatings that contain aluminum intermetallics, predominantly beta-phase nickel aluminide ($\beta$-NiAl) and platinum aluminides (PtAl). Because TBC life depends not only on the environmental resistance but also the strength of its bond coat, bond coats capable of exhibiting higher strength have also been developed, a notable example of which is beta-phase NiAl overlay coatings. In contrast to the aforementioned MCrAlX overlay coatings, which are metallic solid solutions containing intermetallic phases, the NiAl beta phase is an intermetallic compound that exists for nickel-aluminum compositions containing about 30 to about 60 atomic percent aluminum. Examples of beta-phase NiAl overlay coatings are disclosed in commonly-assigned U.S. Pat. Nos. 5,975,852 to Nagaraj et al., U.S. Pat. No. 6,153,313 to Rigney et al., U.S. Pat. No. 6,255,001 to Darolia, U.S. Pat. No. 6,291,084 to Darolia et al., and U.S. Pat. No. 6,620,524 to Pfaendtner at al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. The presence of reactive elements such as zirconium and hafnium in these beta-phase NiAl overlay coatings has been shown to improve environmental resistance as well as strengthen the coating, primarily by solid solution strengthening. However, beyond the solubility limits of the reactive elements, precipitates of a Heusler phase ($Ni_2AlZr$ (Hf, Ti, Ta)) can occur that can drastically lower the oxidation resistance of the coating.

The suitability of environmental coatings and TBC bond coats formed of NiAlPt to contain the gamma phase ($\gamma$-Ni) and gamma-prime phase ($\gamma'$-$Ni_3Al$) has also been considered. For example, in work performed by Gleeson et al. at Iowa State University, Ni-22Al-30Pt compositions (by atomic percent; about Ni-6.4Al-63.5Pt by weight percent) were evaluated, with the conclusion that the addition of platinum to gamma+gamma prime coating alloys is beneficial to their oxidation resistance. It was further concluded that, because nickel-base superalloys typically have a gamma+gamma prime microstructure, there are benefits to coatings that also contain the gamma+gamma prime structure. Finally, Pt–containing gamma+gamma prime coatings modified to further contain reactive elements were also contemplated.

TBC systems and environmental coatings are being used in an increasing number of turbine applications (e.g., combustors, augmentors, turbine blades, turbine vanes, etc.). Notable substrate materials include directionally-solidified (DS) alloys such as René 142 and single-crystal (SX) alloys such as René N5. The oxidation and hot corrosion resistance of an environmental coating and the spallation resistance of a TBC deposited on a bond coat are complicated in part by the composition of the underlying superalloy and interdiffusion that occurs between the superalloy and the environmental coating or bond coat. For example, the above-noted coating materials contain relatively high amounts of aluminum relative to the superalloys they protect, while superalloys contain various elements that are not present or are present in relatively small amounts in these coatings. During coating deposition, a primary diffusion zone of chemical mixing occurs to some degree between the coating and the superalloy substrate as a result of the concentration gradients of the constituents.

Figure 1:
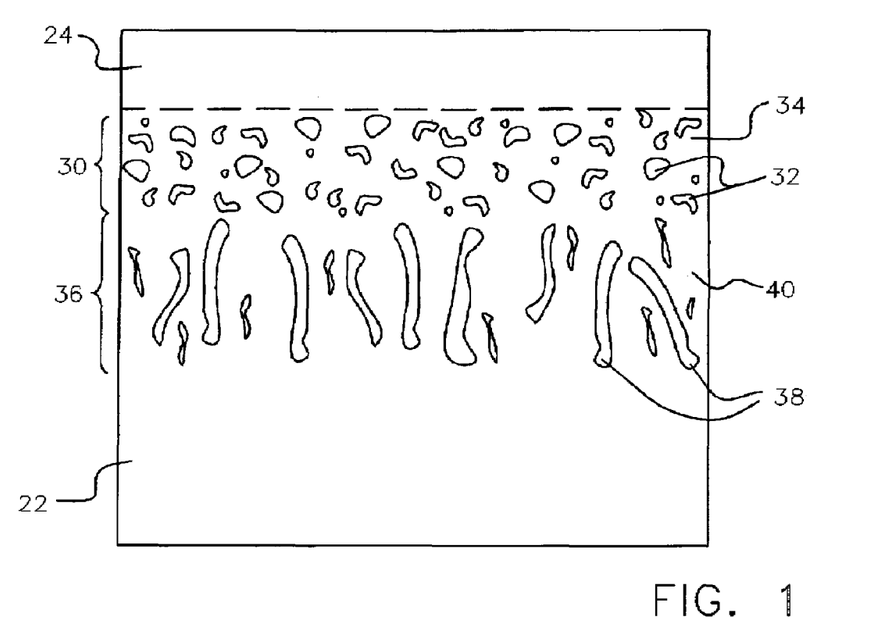
FIG. 1 represents a cross-sectional view through a portion of a substrate on which an aluminum-containing coating has been deposited, and in which a secondary reaction zone has formed as a result of interdiffusion between the substrate and coating.

To illustrate, FIG. 1 depicts an environmental coating 24 overlying a nickel-base superalloy substrate 22. As with many nickel-base superalloys, a primary diffusion zone 30 can be seen in the substrate 22 beneath the coating 24, as would be the case following a high temperature exposure. The primary diffusion zone 30 is represented as containing topologically close-packed (TCP) phases 32 in the gamma matrix phase 34 of the nickel-base superalloy substrate 22. The incidence of a moderate amount of TCP phases 32 beneath the coating 24 is typically not detrimental. At elevated temperatures, further interdiffusion occurs as a result of solid-state diffusion across the substrate/coating interface. This additional migration of elements across the substrate-coating interface can sufficiently alter the chemical composition and microstructure of both the coating 24 and the substrate 22 in the vicinity of the interface to have deleterious results. For example, migration of aluminum out of the coating reduces its oxidation resistance, while the accumulation of aluminum in the substrate 22 beneath the coating can result in the formation of a deleterious secondary reaction zone (SRZ) 36 beneath the primary diffusion zone 30. Certain high strength nickel-base superalloys that contain significant amounts of refractory elements, such as tungsten, tantalum, molybdenum, chromium, and particularly rhenium are prone to the formation of SRZ 36 containing needle-shaped precipitate phases 38 (such as γ phases and TCP phases of rhenium, tungsten and/or tantalum) in a gamma-prime matrix phase 40 (hence, characterized by a gamma/gamma-prime inversion relative to the substrate 22). Because the boundary between SRZ constituents and the original substrate 22 is a high angle boundary that doesn't tolerate deformation, the SRZ 36 and its boundaries readily crack under stress, drastically reducing the load-carrying capability of the alloy.

Notable examples of superalloys prone to deleterious SRZ formation include fourth generation single-crystal nickel-base superalloys disclosed in commonly-assigned U.S. Pat. Nos. 5,455,120 and 5,482,789, commercially known as René N6 and MX4, respectively. There have been ongoing efforts to develop coating systems and coating processes that substantially reduce or eliminate the formation of SRZ in high-refractory alloys coated with diffusion aluminide and overlay coatings. For example, ruthenium-containing diffusion barrier layers are disclosed in commonly-assigned U.S. Pat. No. 6,306,524 to Spitsberg et al. and commonly-assigned and co-pending U.S. patent application Ser. Nos. 09/681,821, 09/683,700, and 10/605,860 to Zhao et al. Even with such advancements, there remains a considerable and continuous effort to further improve the effectiveness of environmental coatings and TBC bond coats, while also mitigating any adverse affects these coatings may have on the substrates they protect.

BRIEF SUMMARY OF THE INVENTION

The present invention generally provides the combination of a superalloy substrate and an overlay coating that environmentally protects the substrate when subjected to a hostile thermal environment, such as that found in the turbine, combustor and augmentor sections of gas turbine engines. The invention is particularly directed to nickel-base superalloy substrates that are prone to the formation of deleterious SRZ, and to a predominantly gamma-prime phase nickel aluminide ($Ni_3Al$) overlay coating that reduces the incidence of SRZ when used as an environmental coating or as a bond coat for a thermal barrier coating (TBC) on the superalloy substrate. The gamma prime-phase nickel aluminide employed in the present invention is one of two stable intermetallic compounds of nickel and aluminum. The gamma prime-phase exists for NiAl compositions containing nickel and aluminum in an atomic ratio of about 3:1, while beta-phase nickel aluminide (NiAl) exists for NiAl compositions containing nickel and aluminum in an atomic ratio of about 1:1. Gamma prime-phase nickel aluminide has a nominal composition of, by weight, about 86.7% nickel and about 13.3% aluminum, in contrast to the beta phase with a nominal composition of, by weight, about 68.5% nickel and about 31.5% aluminum. Accordingly, the gamma prime-phase nickel aluminide overlay coatings of this invention are compositionally distinguishable from beta-phase NiAl overlay coatings, as well as diffusion aluminide coatings that are predominantly beta-phase NiAl.

According to a preferred aspect of the invention, an article is provided having a nickel-base superalloy substrate containing aluminum and at least one element that renders the substrate susceptible to the formation of a secondary reaction zone. A coating system lies on the superalloy substrate and includes a chromium-containing nickel aluminide intermetallic overlay coating of predominantly the gamma prime phase. The intermetallic overlay coating contains aluminum in an amount approximately equal to the aluminum content of the superalloy substrate so as to inhibit diffusion of aluminum from the overlay coating into the substrate.

In view of the above, the invention makes use of a superalloy substrate and coating combination in which the compositions of the substrate and coating are chemically similar in terms of aluminum content. As a result, there is a reduced tendency for aluminum to diffuse from the coating into the substrate, thereby reducing the likelihood that SRZ will form in the substrate. The combination of the superalloy substrate and overlay coating of this invention is particularly advantageous where the substrate is formed of a high strength nickel-base superalloy containing a significant amount of refractory elements, such as rhenium, tungsten, tantalum, hafnium, molybdenum, niobium, and zirconium, which are known to promote the formation of deleterious SRZ that contains TCP phases as a result of the diffusion of aluminum from an aluminum-containing coating.

In addition to the above, gamma prime-phase nickel aluminide intermetallic overlay coatings suitable for use with this invention are believed to have a number of additional advantages over existing overlay and diffusion coatings used as environmental coatings and bond coats for TBC. The gamma-prime phase ($Ni_3Al$) is intrinsically stronger than the beta phase (NiAl), enabling the overlay coatings of this invention to better inhibit spallation events brought on by stress-related factors. Additional benefits are believed to be possible as a result of the higher solubility of reactive elements in the gamma-prime phase, such that much greater additions of these elements can be incorporated into the overlay coating to further improve the environmental resistance and strength of the coating.

Other objects and advantages of this invention will be better appreciated from the following detailed description.

DETAILED DESCRIPTION OF THE INVENTION

Figure 2:
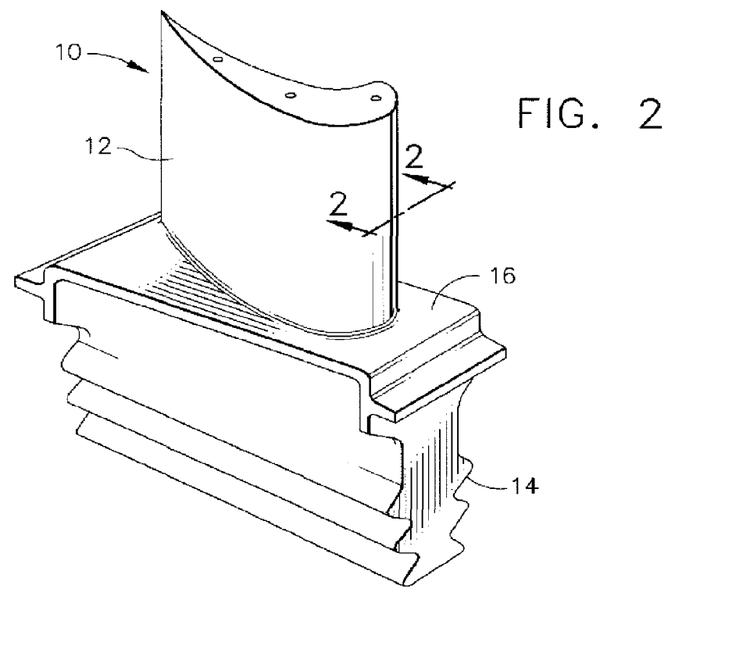
FIG. 2 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. One such example is the high pressure turbine blade 10 shown in FIG. 2. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. While the advantages of this invention will be described with reference to the high pressure turbine blade 10 shown in FIG. 2, the teachings of this invention are generally applicable to any component on which a coating system may be used to protect the component from its environment.

Figure 3:
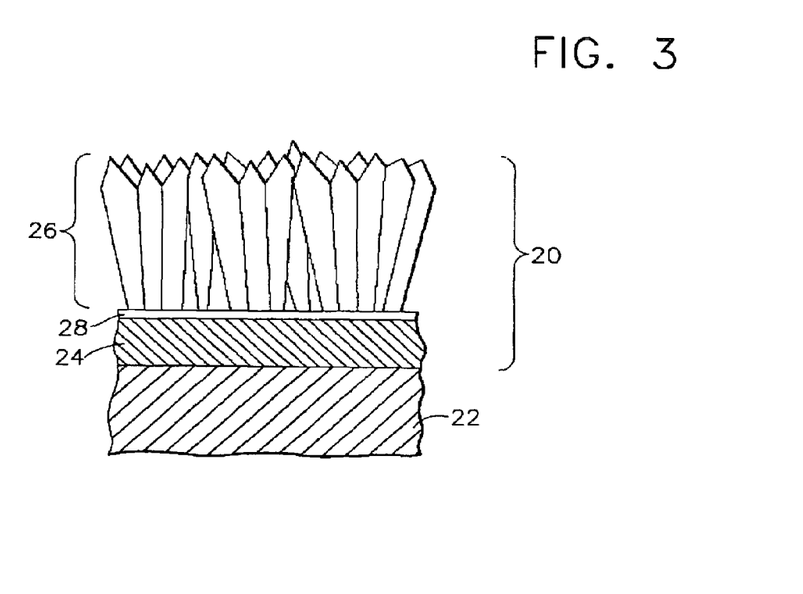
FIG. 3 is a cross-sectional view of the blade of FIG. 2 along line 2-2, and shows a thermal barrier coating system on the blade in accordance with an embodiment of this invention.

Represented in FIG. 3 is a surface region of the blade 10, depicting a TBC system 20 on the superalloy substrate 22 of the blade 10. The substrate 22 (blade 10) is a high-temperature nickel-base superalloy of a type that benefits from the teachings of this invention, in that the substrate 22 is prone to SRZ formation (as previously described in reference to FIG. 1). Superalloys prone to SRZ formation include those containing one or more refractory metals, such as tantalum, tungsten, molybdenum, rhenium, and hafnium. SRZ formation is particularly prevalent in superalloys containing three weight percent or more of rhenium, e.g., at least four weight percent, two examples of which are the above-noted MX4 and N6 alloys. MX4 has a composition of, by weight, 0.4% to 6.5% ruthenium, 4.5% to 5.75% rhenium, 5.8% to 10.7% tantalum, 4.25% to 17.0% cobalt, up to 1.0% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, a molybdenum+chromium+niobium content of 2.15% to 9.0%, an aluminum+titanium+tungsten of 8.0% to 15.1%, with the balance nickel and incidental impurities. N6 has a composition of, by weight, about 5.1% to 5.6% rhenium, about 5% to less than 6.25% aluminum, about 4.0% to about 6% chromium, about 0.5% to about 2.0% molybdenum, the combination of chromium+molybdenum from about 4.6% to 6.5%, about 7% to less than 9.25% tantalum, about 10% to 15% cobalt, about 5% to 6.5% tungsten, about 0.1% to 1.0% hafnium, about 0.02% to 0.07% carbon, about 0.003% to 0.01% boron, about 0% to 0.03% yttrium, about 0% to 6% ruthenium, about 0% to 1% columbium, with the balance nickel and incidental impurities. Another nickel-base superalloy of interest to the invention is René N5 (U.S. Pat. No. 6,074,602), having a composition, by weight, of about 5 to 10% chromium, 5 to 10% cobalt, 0 to 2% molybdenum, 3 to 8% tungsten, 3 to 8% tantalum, 0 to 2% titanium, 5 to 7% aluminum, up to 6% rhenium, 0.08 to 0.2% hafnium, 0.03 to 0.07% carbon, 0.003 to 0.006% boron, and 0.0 to 0.04% yttrium, the balance being nickel and incidental impurities.

As shown in FIG. 3, the coating system 20 includes a ceramic layer (TBC) 26 bonded to the blade substrate 22 with an overlay coating 24, which therefore serves as a bond coat to the TBC 26. To attain the strain-tolerant columnar grain structure depicted in FIG. 3, the TBC 26 is preferably deposited by physical vapor deposition (PVD), though other deposition techniques could be used including thermal spray processes. A preferred material for the TBC 26 is an yttria-stabilized zirconia (YSZ), with a suitable composition being about 3 to about 20 weight percent yttria (3-20% YSZ), though other ceramic materials could be used, such as yttria, nonstabilized zirconia, and zirconia stabilized by other oxides. Notable alternative materials for the TBC 26 include those formulated to have lower coefficients of thermal conductivity (low-k) than 7% YSZ, notable examples of which are disclosed in commonly-assigned U.S. Pat. No. 6,586,115 to Rigney et al., U.S. Pat. No. 6,686,060 to Bruce et al., commonly-assigned U.S. patent application Ser. No. 10/063,962 to Bruce, U.S. patent application Ser. No. 10/064,785 to Darolia et al., and U.S. patent application Ser. No. 10/064,939 to Bruce et al., and U.S. Pat. No. 6,025,078 to Rickerby. Still other suitable ceramic materials for the TBC 26 include those that resist spallation from contamination by compounds such as CMAS (a eutectic of calcia, magnesia, alumina and silica). For example, the TBC can be formed of a material capable of interacting with molten CMAS to form a compound with a melting temperature that is significantly higher than CMAS, so that the reaction product of CMAS and the material does not melt and infiltrate the TBC. Examples of CMAS-resistant coatings include alumina, alumina-containing YSZ, and hafnia-based ceramics disclosed in commonly-assigned U.S. Pat. Nos. 5,660,885, 5,683,825, 5,871,820, 5,914,189, and 6,627,323 and commonly-assigned U.S. patent application Ser. Nos. 10/064,939 and 10/073,564, whose disclosures regarding CMAS-resistant coating materials are incorporated herein by reference. Other potential ceramic materials for the TBC include those formulated to have erosion and/or impact resistance better than 7% YSZ. Examples of such materials include certain of the above-noted CMAS-resistant materials, particularly alumina as reported in U.S. Pat. No. 5,683,825 and U.S. patent application Ser. No. 10/073,564. Other erosion and impact-resistant compositions include reduced-porosity YSZ as disclosed in commonly-assigned U.S. patent application Ser. Nos. 10/707,197 and 10/708,020, fully stabilized zirconia (e.g., more than 17% YSZ) as disclosed in commonly-assigned U.S. patent application Ser. No. 10/708,020, and chemically-modified zirconia-based ceramics. The TBC 26 is deposited to a thickness that is sufficient to provide the required thermal protection for the underlying substrate 22 and blade 10, generally on the order of about 100 to about 300 micrometers.

As with prior art TBC systems, the surface of the overlay coating 24 has a composition that when exposed to an oxidizing environment forms an aluminum oxide surface layer (alumina scale) 28 to which the TBC 26 chemically bonds. According to the invention, the overlay coating 24 is predominantly of gamma-prime phase nickel aluminide ($Ni_3Al$), preferably with limited alloying additions. Depending on its composition, the overlay coating 24 can be deposited using a single deposition process or a combination of processes. An adequate thickness for the overlay coating 24 is about fifty micrometers in order to protect the underlying substrate 22 and provide an adequate supply of aluminum for formation of the alumina scale 28, though thicknesses of about twelve to about one hundred micrometers are believed to be suitable.

To be predominantly of the gamma-prime intermetallic phase, the overlay coating 24 of this invention preferably contains nickel and aluminum in an atomic ratio of about 3 to 1, which on a weight basis is about 86.7 to 13.3. In accordance with a preferred aspect of the invention, with further alloying additions the aluminum content of the overlay coating 24 may be as low as about 6 weight percent while still being sufficient to form the desired alumina scale 28. An aluminum content upper limit of about 15 weight percent is generally necessary to stay within the gamma-prime field. However, according to a preferred aspect of the invention, the aluminum level of the coating 24 is at or near the aluminum level in the substrate 22. As such, if used as an environmental coating or bond coat on the above-noted MX4 or N6 superalloys (maximum aluminum contents of 6.6 and 6.25 weight percent, respectively), the coating 24 preferably has an aluminum content of not more than about 8.5 weight percent.

Figure 4:
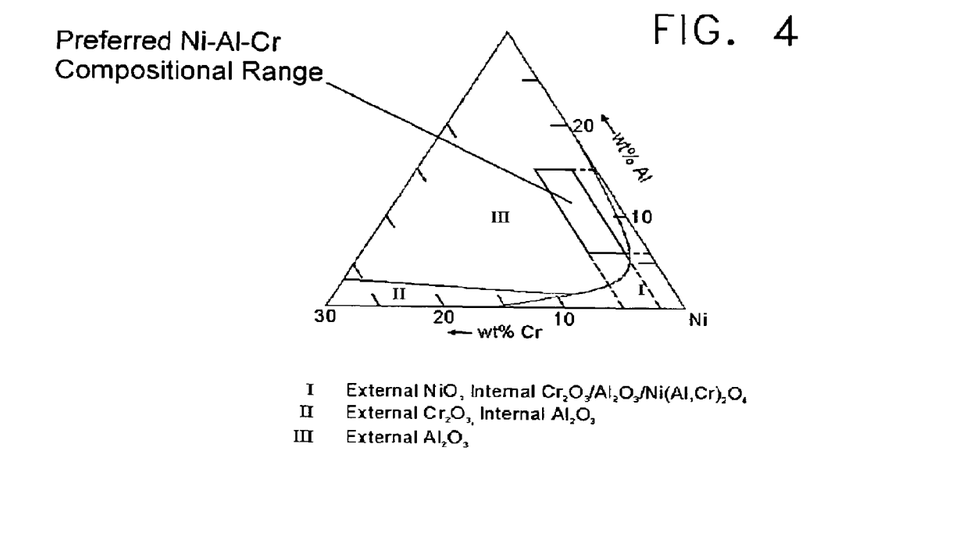
FIG. 4 is a chart indicating the suitable compositional ranges for nickel, aluminum and chromium in a gamma prime-phase nickel aluminide intermetallic overlay coating of this invention.

Preferred alloying additions for the coating 24 include chromium, platinum group metals (platinum, rhodium, palladium, and iridium), reactive elements such as zirconium, hafnium, yttrium, cerium, etc., and silicon. A suitable chromium content is about 2 to 5 weight percent chromium. Chromium is a desirable additive as it promotes the corrosion resistance of the overlay coating 24 as well as helps in the formation of the alumina scale 28, especially when the aluminum content of the coating 24 is near the lower end of the above-noted range for aluminum. This preferred relationship between the aluminum and chromium content is depicted in FIG. 4, and discussed in commonly-assigned U.S. patent application Ser. No. 10/904,220, filed concurrently herewith. Chromium contents above about 5 weight percent are believed to be detrimental. For example, higher chromium contents refine the alumina grain size leading to higher oxidation rates, and promote the formation of non-protective $Cr_2O_3$ scale as opposed to the desired alumina scale 28. Higher chromium contents also risk the formation of volatile chromium trioxide ($CrO_3$), and may reduce the formability of the gamma-prime phase compositions. This aspect is important in the manufacture of ingots that would be used as a source material if depositing the coating 24 by ion plasma deposition or EBPVD.

Platinum (and other platinum group metals) are known to have a beneficial effect with conventional diffusion aluminide coatings. When added to the predominantly gamma-prime phase of the overlay coating 24 of this invention, platinum group metals have been shown to improve oxidation resistance by enhancing the ability of the coating 24 to form an adherent alumina scale. Excellent oxidation resistance measured by weight gains and the rate constants (kp) have also been achieved with certain Ni-Al-Pt intermetallic compositions. A platinum group metal content of up to about 60 weight percent is believed to be beneficial for the gamma-prime phase overlay coating 24. A platinum group metal content of about 50 to 60 weight percent is desirable on the basis of reducing the amount of aluminum to something near that of the substrate 22, while still being at a sufficient level in the coating 24 to form the desired gamma-prime phase with nickel.

The addition of one or more reactive elements to the overlay coating 24 in a combined amount of at least 0.5 weight percent is preferred for promoting the corrosion resistance and strength of the gamma-prime phase. A combined or individual reactive element content of above about 4 weight percent is believed to be detrimental due to the solubility limits of the individual elements in the gamma-prime phase and the adverse effect that these elements have on ductility of the gamma-prime phase beyond this level.

Limited additions of silicon are believed to have a strong beneficial effect on oxidation resistance in gamma-prime phase compositions. However, silicon must be controlled to not more than about 2 weight percent to avoid excessive interdiffusion into the substrate 22.

On the basis of the above, the nickel content of the coating 24 may be as high as about 90 weight percent (such as when aluminum and chromium are the only other constituents of the coating 24) to ensure that the coating 24 is predominantly of the gamma-prime phase. On the other hand, nickel contents of as low as about 20 weight percent may exist if the coating 24 contains the maximum levels of chromium, reactive element(s), silicon and platinum group metal. Generally, for those coatings 24 containing chromium, reactive elements, and aluminum at or near the aluminum level of the substrate 22 (e.g., about 6.0 to about 8.5 weight percent aluminum), the nickel content is preferably in a range of about 84.5 to about 86 weight percent in order to form the desired gamma-prime phase with aluminum.

Figure 5:
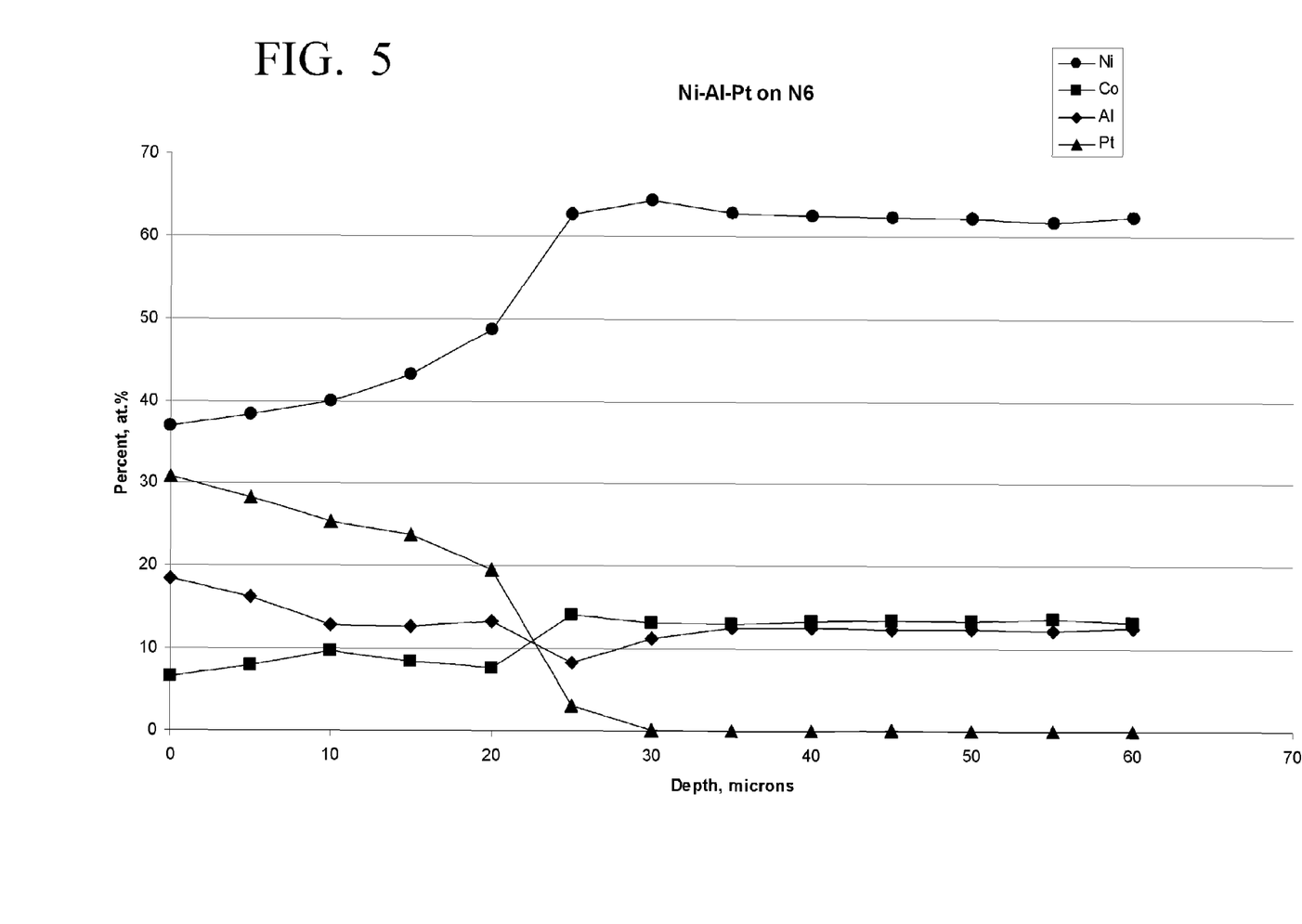
FIGS. 5 and 6 plot variations in nickel, aluminum, cobalt, and platinum levels in nickel-base superalloy substrates and gamma prime-phase nickel aluminide intermetallic overlay coatings deposited thereon in accordance with this invention.
Figure 6:
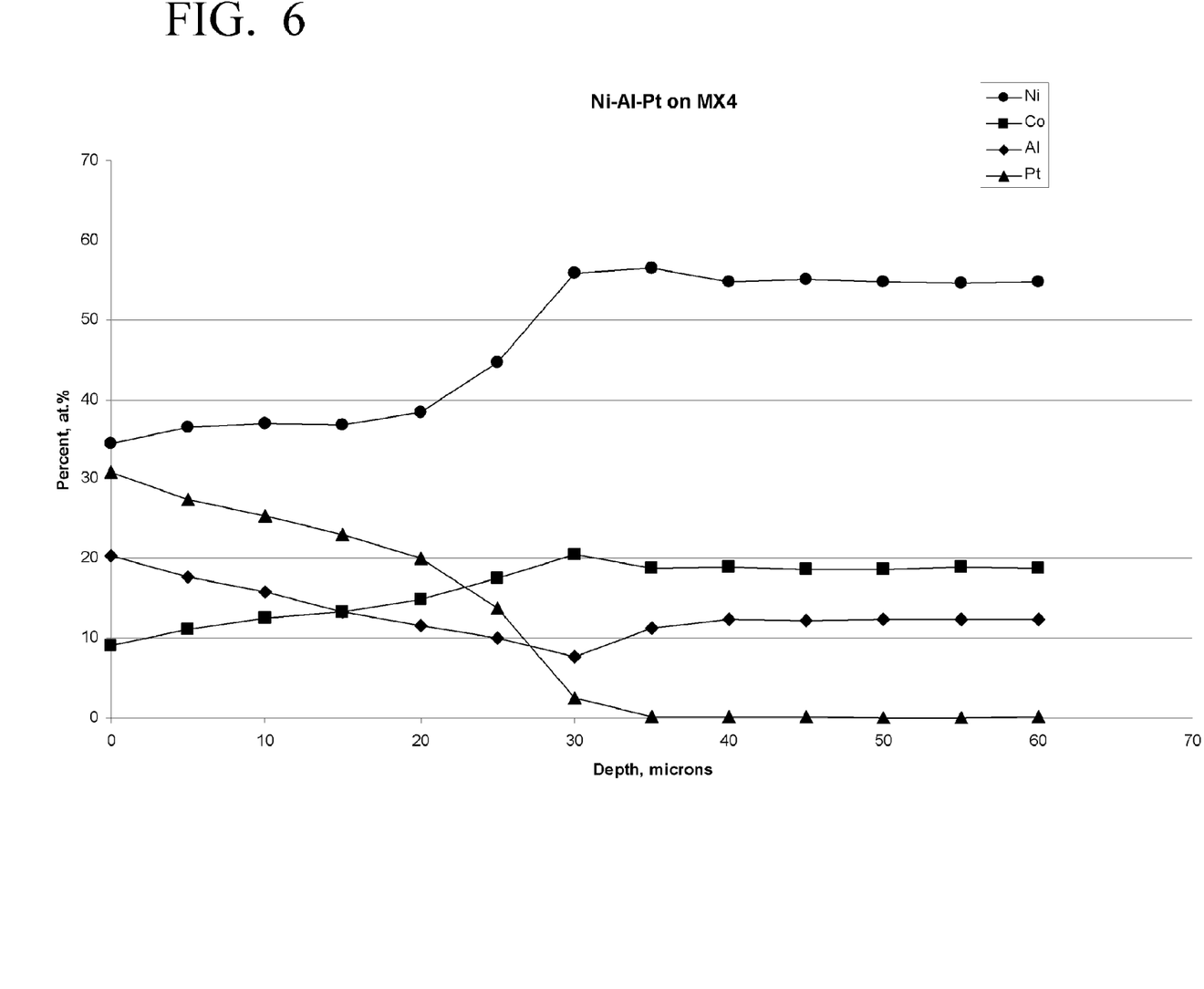

FIGS. 5 and 6 are plots of the N6 and MX4 superalloys, respectively, on which the coating 24 of this invention has been deposited. Only the nickel, aluminum, platinum, and cobalt levels are plotted for simplicity. In addition, based on the N6 and MX4 compositions, other constituents present in the coatings 24 included tungsten, rhenium, tantalum, molybdenum, etc., (about 5 to 8 weight percent combined), which diffused into the coatings 24 from their underlying substrates. The "dip" in the aluminum content generally located at the interface between each coating and its substrate was attributed to the diffusion of aluminum from the substrates into the coatings.

While the invention has been described in terms of a preferred embodiment, it is apparent that other forms could be adopted by one skilled in the art. Accordingly, the scope of the invention is to be limited only by the following claims.

What is claimed is:

1. An article comprising:
a nickel-base superalloy substrate containing aluminum and at least one element that renders the substrate susceptible to the formation of a secondary reaction zone; and
a coating system on the superalloy substrate, the coating system comprising a chromium-containing nickel aluminide intermetallic overlay coating overlying a surface of the substrate, the intermetallic overlay coating being predominantly gamma prime phase nickel aluminide, the intermetallic overlay coating containing up to about five weight percent chromium and containing aluminum in an amount approximately equal to the aluminum content of the superalloy substrate so as to inhibit diffusion of aluminum from the intermetallic overlay coating into the superalloy substrate.

2. The article according to claim 1, wherein the at least one element is at least one refractoy metal selected from the group consisting of about tantalum, tungsten, molybdenum, rhenium, and hafnium.

3. The article according to claim 1, wherein the superalloy substrate contains at least 3 weight percent rhenium.

4. The article according to claim 1, wherein the superalloy substrate consists of, by weight, 0.4% to 6.5% ruthenium, 4.5% to 5.75% rhenium, 5.8% to 10.7% tantalum, 4.25% to 17.0% cobalt, up to 1.0% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, and wherein the sum of molybdenum plus chromium plus niobium is 2.15% to 9.0%, and wherein the sum of aluminum plus titanium plus tungsten is 8.0% to 15.1%, the balance nickel and incidental impurities.

5. The article according to claim 1, wherein the superalloy substrate consists of, by weight, about 5.1% to 5.6% rhenium, about 5% to less than 6.25% aluminum, about 4.0% to about 6% chromium, about 0.5% to about 2.0% molybdenum, the combination of chromium+molybdenum from about 4.6% to 6.5%, about 7% to less than 9.25% tantalum1 about 10% to 15% cobalt, about 5% to 6.5% tungsten, about 0.1% to 1.0% hafnium, about 0.02% to 0.07% carbon, about 0.003% to 0.01% boron, about 0% to 0.03% yttrium, about 0% to 6% ruthenium, about 0% to 1% columbium, with the balance nickel and incidental impurities.

6. The article according to claim 1, wherein the intermetallic overlay coating contains, by weight, not more than about 8.5% aluminum.

7. The article according to claim 1, wherein the intermetallic overlay coating contains nickel and aluminum in an atomic ratio of about 3:1.

8. The article according to claim 1, wherein the intermetallic overlay coating consists of, by weight, about 6% to not more than 15% aluminum, about 2% to about 5% chromium, optionally up to 4% of a reactive element, optionally up to 2% silicon, optionally up to 60% of at least one platinum group metal, up to about 8% of elements that have diffused from the substrate, and the balance nickel.

9. The article according to claim 1, wherein the intermetallic overlay coating further contains at least one platinum group metal in an amount of up to 60 weight percent.

10. The article according to claim 1, wherein the intermetallic overlay coating contains at least 0.5 weight percent of at least one of zirconium, hafnium, yttrium, and cerium as the reactive element.

11. The article according to claim 1, further comprising a thermal-insulating ceramic layer adhered to the intermetallic overlay coating.

12. A gas turbine engine component comprising:
a nickel-base superalloy substrate containing aluminum and at least one refractory metal that renders the substrate susceptible to the formation of a secondary reaction zone; and
a coating system comprising a ceramic layer on an nickel aluminide intermetallic overlay coating overlying a surface of the substrate, the intermetallic overlay coating being predominantly gamma prime phase nickel aluminide, the intermetallic overlay coating consisting of, by weight, at least 6% to about 15% aluminum, about 2% to about 5% chromium, at least one platinum group metal in an amount up to 60%, optionally up to 4% of a reactive element, optionally up to 2% silicon, and up to about 8% of elements that have diffused from the substrate, the aluminum content of the intermetallic overlay coating being approximately equal to the aluminum content of the superalloy substrate so as to inhibit diffusion of aluminum from the intermetallic overlay coating into the superalloy substrate;
wherein a region of the substrate contacting the intermetallic overlay coating is substantially free of a secondary reaction zone.

13. The gas turbine engine component according to claim 12, wherein the at least one refractory metal is selected from the group consisting of about tantalum, tungsten, molybdenum, rhenium, and hafnium.

14. The gas turbine engine component according to claim 12, wherein the superalloy substrate contains at least 4 weight percent rhenium.

15. The gas turbine engine component according to claim 12, wherein the intermetallic overlay coating contains, by weight, not more than about 8.5% aluminum, and the superalloy substrate consists of, by weight, 0.4% to 6.5% ruthenium, 4.5% to 5.75% rhenium, 5.8% to 10.7% tantalum, 4.25% to 17.0% cobalt, up to 1.0% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, and wherein the sum of molybdenum plus chromium plus niobium is 2.15% to 9.0%, and wherein the sum of aluminum plus titanium plus tungsten is 8.0% to 15.1%, the balance nickel and incidental impurities.

16. The gas turbine engine component according to claim 12, wherein the intermetallic overlay coating contains, by weight, not more than about 8.5% aluminum, and the superalloy substrate consists of, by weight, about 5.1% to 5.6% rhenium, about 5% to less than 6.25% aluminum, about 4.0% to about 6% chromium1 about 0.5% to about 2.0% molybdenum, the combination of chromium+molybdenum from about 4.6% to 6.5%, about 7% to less than 9.25% tantalum, about 10% to 15% cobalt, about 5% to 6.5% tungsten, about 0.1% to 1.0% hafnium, about 0.02% to 0.07% carbon, about 0.003% to 0.01% boron, about 0% to 0.03% yttrium, about 0% to 6% ruthenium, about 0% to 1% columbium, with the balance nickel and incidental impurities.

17. The gas turbine engine component according to claim 12, wherein the intermetallic overlay coating contains, by weight, not more than about 8.5% aluminum, and contains nickel and aluminum in an atomic ratio of about 3:1.

18. The gas turbine engine component according to claim 12, wherein the intermetallic overlay coating contains silicon.

19. The gas turbine engine component according to claim 12, wherein the intermetallic overlay coating contains at least 0.5 weight percent of at least one of zirconium, hafnium, yttrium, and cerium as the reactive element.

20. The gas turbine engine component according to claim 12, wherein the ceramic layer is partially-stabilized zirconia.

21. The gas turbine engine component according to claim 20, wherein the ceramic layer is yttria-stabilized zirconia.

22. The gas turbine engine component according to claim 20, wherein the ceramic layer has a thermal conductivity of less than zirconia stabilized by about seven weight percent yttria.

23. An article comprising:
a nickel-base superalloy substrate containing aluminum and at least one element that renders the substrate susceptible to the formation of a secondary reaction zone; and
a coating system on the superalloy substrate, the coating system comprising a chromium-containing nickel aluminide intermetallic overlay coating overlying a surface of the substrate, the intermetallic overlay coating being predominantly gamma prime phase nickel aluminide, the intermetallic overlay coating consisting of, by weight, about 6% to not more than 15% aluminum, about 2% to about 5% chromium, optionally up to 4% of a reactive element, optionally up to 2% silicon, optionally up to 60% of at least one platinum group metal, up to about 8% of elements that have diffused from the substrate, and the balance nickel, the intermetallic overlay coating containing aluminum in an amount approximately equal to the aluminum content of the superalloy substrate so as to inhibit diffusion of aluminum from the intermetallic overlay coating into the superalloy substrate.

* * * * *